Figure 1:
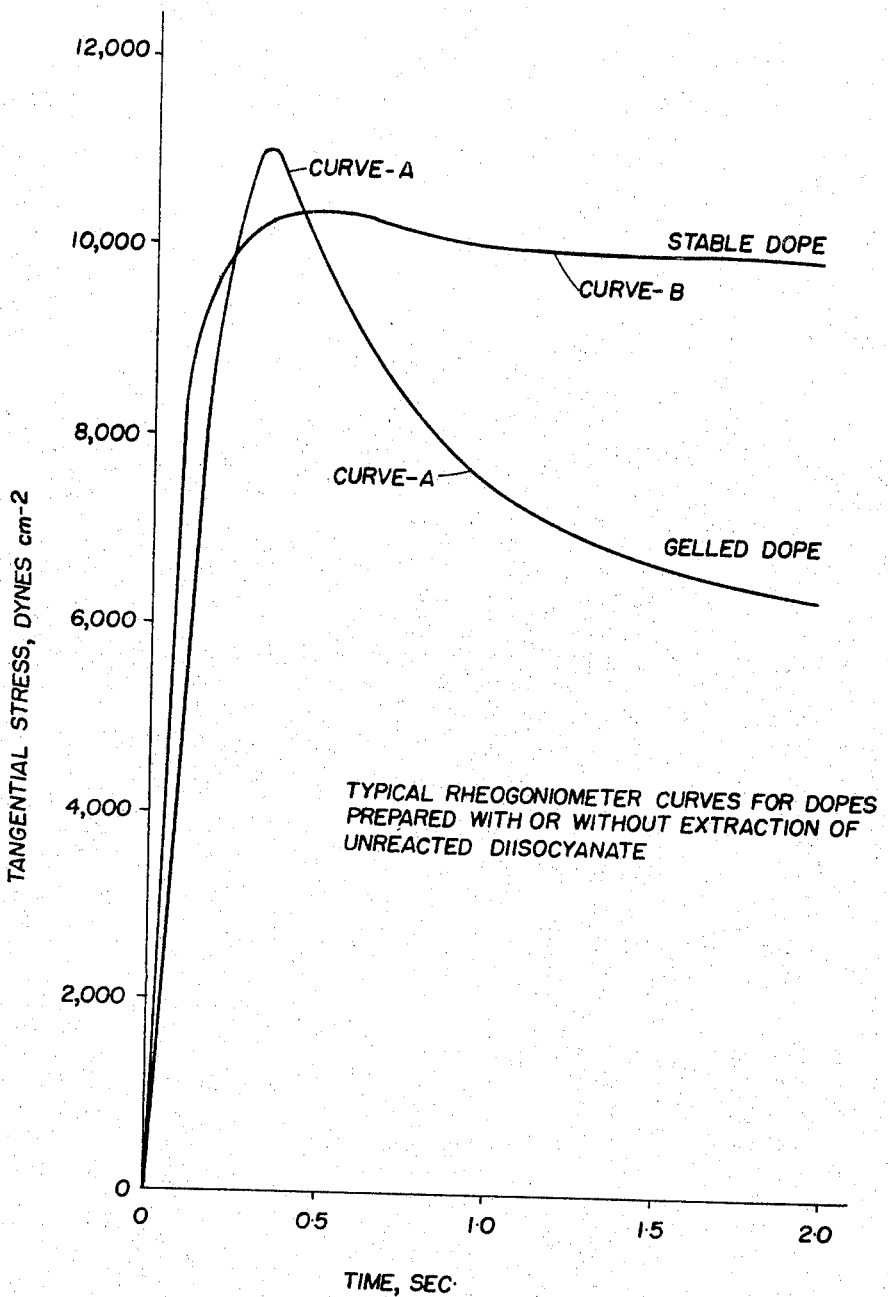

United States Patent Office 3,415,790
Patented Dec. 10, 1968

3,415,790
REMOVING UNREACTED DIISOCYANATES FROM MACRODIISOCYANATES AND POLYMERIZING TO FORM SEGMENTED POLYURETHANE COPOLYMERS
Burns Davis and Roger M. Schulken, Jr., Kingsport, Tenn., assignors to Eastman Kodak Company, Rochester, N.Y., a corporation of New Jersey
Filed June 29, 1964, Ser. No. 378,711
16 Claims. (Cl. 260—77.5)

This invention is identified as Case G in a series of eight related patent applications being filed concurrently in the U.S. Patent Office.

The cases are identified as follows:

Case:
A_____Ser. No. 379,002, filed June 29, 1964
B_____Ser. No. 379,020, filed June 29, 1964
C_____Ser. No. 378,950, filed June 29, 1964
D_____Ser. No. 378,961, filed June 29, 1964
E_____Ser. No. 379,019, filed June 29, 1964
F_____Ser. No. 378,951, filed June 29, 1964
G_____Ser. No. 378,711, filed June 29, 1964
H_____Ser. No. 378,963, filed June 29, 1964

This particular Case G covers a new and improved process for preparing new and improved copolymers and fibers thereof from novel spinning solutions of improved stability. Case G covers those segmented polyurethane copolymers covered by U.S. 2,929,804, U.S. 3,097,192 and Cases A, B, C and D as described below thereby including those segmented copolymers derived from polyesters and poly(ester-ethers) as well as polyethers, where the urea segment comprises from about 2 to 40 percent by weight of the copolymer. The process comprises first preparing a macrodiisocyanate from one or more aliphatic or aromatic diisocyanates and a polyether, polyester, or poly(ester-ether) in a mole ratio substantially greater than 1.3 to 1 so as to form a macrodiisocyanate, treating the macrodiisocyanate so as to remove a substantial amount (40–100 percent) of the unreacted diisocyanate (advantageously at least 60 percent and preferably at least 80 percent) and then chain-extending the treated macrodiisocyanate with water and/or one or more aliphatic or aromatic organic diamines by a solution polymerization process to form a stable solution containing 5 to 50 percent by weight of segmented copolymer. This process unexpectedly yields stable solutions which can be stored for greatly extended periods of time before being spun into spandex fibers. These solutions can be used as such or modified with other solvents prior to spinning.

An object of this invention is to provide a new and improved process for preparing synthetic essentially noncross-linked segmented copolymers capable of forming elastomeric filaments, sometimes called spandex fibers, which possess unexpectedly improved elastomeric characteristics and are so greatly improved in their resistance to yellowing that they can be considered as substantially nonyellowing in normal use. A further object is to provide new and improved essentially linear segmented polyurethane copolymers which can be readily formed into such elastomeric filaments or other shaped elastomeric products. An additional object is to provide spinning solutions of such copolymers whereby filaments can be readily spun by wet or dry spinning procedures.

Figure 2:
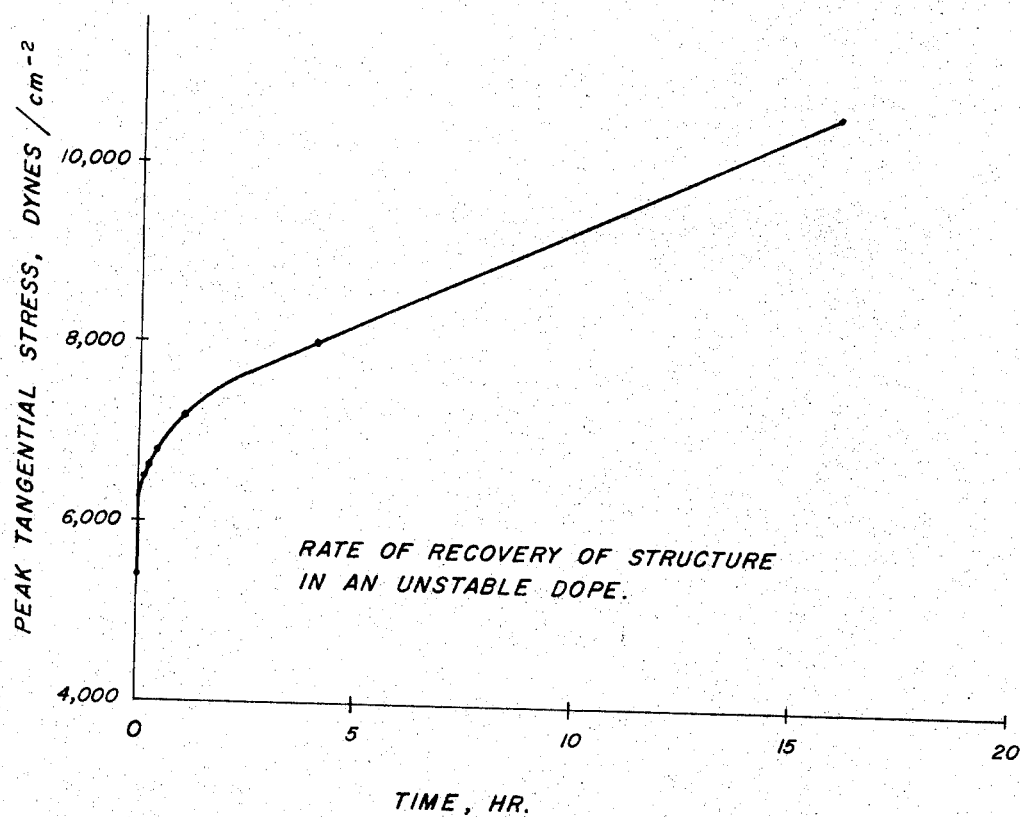

In the drawings FIGURE 1 illustrates the difference obtained between a dope produced by the process of this invention as compared to a conventional dope. FIGURE 2 is presented in order to demonstrate the behavior of gels under stress. Further explanation of these drawings is given in the second and third paragraphs preceding the examples set forth below. Reference is also made to discussion of these drawings following Example 8B hereinbelow.

The instant invention and the other seven related inventions pertain to elastomeric fibers and segmented polyurethane copolymers of which such fibers are composed. Prior art illustrative of related copolymers and elastomeric fibers includes Steuber U.S. Patent 2,929,804 which discloses poly(ether-urethane-ureas) and Schilt U.S. Patent 3,097,192 which discloses poly(ester-urethane-ureas) wherein the urea segments are present in an amount of from about 10% to about 40% by weight of the segmented copolymer and wherein all of the working examples teach that the urethane linkages are directly connected by an aromatic nuclear linkage, the advantageous character of this aromatic nuclear linkage being also emphasized elsewhere in the Steuber and Schilt specifications. Other related disclosures include U.S. 2,843,-568; U.S. 2,929,800; U.S. 2,929,802; U.S. 2,929,803; U.S. 2,948,691; U.S. 2,957,852; U.S. 2,965,437; U.S. 3,044,-987; U.S. 3,071,557, and U.S. 3,111,368.

Although the art is fairly well developed in the spandex fiber field, there are such a large number of unpredictable variables that it is very difficult to achieve further improvements as a result of experimentation since most experiments lead to inferior results. Discoveries in this field must therefore be considered as applicable to only those segmented copolymers as are clearly within the purview of the experimental results as established by working examples.

As a consequence of extensive research and investigation in this field, the above-mentioned series of eight related and unexpected discoveries have been made with respect to segmented polyurethane copolymers and elastomeric filaments thereof which are also referred to herein as spandex fibers. The other seven inventions which are interrelated are partially summarized as follows.

Case A filed by Davis, Kibler and Smith covers new and improved nonyellowing spandex fibers of novel segmented copolymers which are poly(ether-urethane-ureas) composed of (1) polyethers including urethane linked oligomers thereof having a molecular weight of from about 3,000 to about 12,000, (2) organic functionally aliphatic diisocyanates, and (3) water and/or organic functionally aliphatic nonhindered diamines, in which segmented copolymers from 2 to 9% by weight consists of urea segments. The surprising utility of these spandex fibers is in a large part due to the unexpected discovery that functionally aliphatic diisocyanates can be successfully reacted with polyethers having relatively high molecular weights and then be chain-extended, preferably using the process of Case E and advantageously also the process of Cases F and/or G. The successful use of water as a chain-extender in Case A achieves surprisingly advantageous results. The spandex fibers of Case A have greatly improved nonyellowing properties, superior elastomeric characteristics and other improved properties as compared to the prior art. However, even better properties are covered by Case C. The polyether portion can be replaced with a polyester or poly(ester-ether) of analogous properties.

Case B filed by Davis, Kibler and Smith covers new and improved nonyellowing spandex fibers of novel segmented copolymers which are poly(ether-urethane-ureas) composed of (1) polyethers including urethane linked oligomers thereof having a molecular weight of from about 600 to about 10,000, (2) organic functionally aliphatic diisocyanates, and (3) organic functionally aliphatic hindered diamines of which up to 50 mole percent can be replaced with water, in which segmented copolymers from about 5 to about 25% by weight consists of urea segments. The surprising utility of these spandex fibers is in a large part due to the unexpected discovery that functionally aliphatic diisocyanates can be successfully reacted with polyethers of an unexpectedly wide range of molecular weights when the chain-extender diamine has a functionally hindered aliphatic structure. The spandex fibers of this invention have greatly improved nonyellowing properties as compared to the prior art. They also have excellent elastomeric characteristics. The polyether portion can be replaced with a polyester or poly(ester-ether) of analogous properties. In order to provide satisfactorily spinnable dopes according to Case B when the urea segment is appreciably more than about 9% by weight of the segmented copolymer, it is generally necessary to use a process as described in Case E and advantageously also the processes of Case F and/or Case G. The modulus values of fibers at elongations of greater than 100% are at their most advantageous values when the hard segment is appreciably more than 9% by weight of the segmented copolymer.

Case C filed by Davis, Kibler and Smith covers new and improved nonyellowing spandex fibers of novel segmented copolymers which are poly(ether-urethane-ureas) composed of (1) copolyethers containing alkylene-cycloalkylene-alkylene hydrocarbon groups, and copolyethers having the formula:

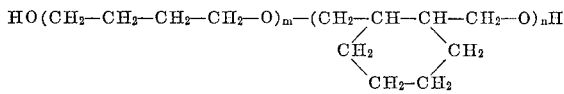

where $m$ is 3 to 25 times $n$, including urethane linked oligomers thereof having a molecular weight of from about 3,500 to about 12,000, and mixtures of these copolyethers with a minor proportion by weight of poly(tetramethylene glycol), (2) organic functionally aliphatic diisocyanates selected from the meta and para position isomers of xylylene diisocyanate, and (3) water and/or organic functionally aliphatic nonhindered diamines, in which segmented copolymers from 2 to 8 percent by weight consist of urea segments. The surprisingly unexpected magnitude of certain advantageous properties of these spandex fibers is in a large part due to the unexpected discovery that functionally aliphatic m- or p-xylylene diisocyanate can be especially advantageously reacted with certain polyether copolymers having relatively high molecular weights as described in Case D, and then be chain-extended using one or more of those advantageous processes covered by Cases E, F and G. The spandex fibers of this invention have greatly improved nonyellowing properties, superior elastomeric characteristics and other improved properties as compared to the prior art. As compared to the generic disclosure in Case A, the spandex fibers of Case C are unexpectedly superior with respect to their properties at low temperatures as a result of the employment of the particular copolyethers. Moreover, the employment of m- and/or p-xylylene diisocyanate provides elastomeric characteristics which are unexpectedly superior to those achieved by the use of other functionally aliphatic diisocyanates as covered by Cases A and B and which are substantially more superior to those achieved when functionally aromatic diisocyanates are used as included in Cases D, F and G. Exceptionally useful spandex fibers can be produced from copolymers having only 2 percent to 6 percent by weight of urea segments.

Case D filed by Bell, Kibler and Smith is related to their earlier U.S. application Ser. No. 231,586 (now U.S. Patent No. 3,243,413, patented on Mar. 29, 1966), and is based upon the discovery that unexpectedly advantageous low-temperature properties can be achieved with respect to novel segmented polyurethane copolymers including those illustrated by U.S. 2,929,804. Thus, Case D encompasses poly(ether-urethane-ureas) which are covered by Cases A–C and E–H, inclusive, which are composed of (1) copolyethers of the formula set forth in Case C but also including those where the molecular weight is as low as 600 and $m$ is 2 to 50 times $n$, (2) organic diisocyanates which are functionally aromatic as in U.S. 2,929,804 as well as those which are functionally nonaromatic as set forth in Cases A, B and C, and (3) water and/or functionally aromatic and/or aliphatic organic diamines which can be nonhindered as in Cases A and C or hindered as in Case B, in which segmented copolymers from 2 to 40% by weight consists of urea segments.

Case E filed by Davis and Lyon covers a new and improved process for preparing those segmented polyurethane copolymers where the urea segment comprises from about 2–9% by weight of the copolymer as in Case A, 5–25% as in Case B and 2–8% as in Case C. Unexpectedly, it was discovered that rapid smooth reactions between the macrodiisocyanates and the chain-extender diamines (the employment of water is excluded) could be achieved by a relatively quite hot solution polymerization process in the range of 60–200° C. (preferably 75°–150° C.) despite prior art teachings showing a preference that room temperatures or ice baths should be employed to avoid difficulties such as the formation of intractable gels. Moreover, the employment of high temperature polymerization was found to make possible the formation of more concentrated dopes of greater utility in spinning fibers. Even more advantageous results are achieved in combination with the process of Case F and/or Case G. The polyether portion of the segmented copolymer can be replaced with a polyester or poly(ester-ether) of analogous properties.

Case F filed by Knowles and Smith covers a new and improved process for preparing stable spinning solutions of those segmented polyurethane copolymers covered by U.S. 2,929,804, U.S. 3,097,192 and Cases A, B, C, and D, thereby including those segmented copolymers derived from polyesters and poly(ester-ethers) as well as polyethers, where the urea segment comprises from about 2 to about 40% by weight of the copolymer. The process comprises making a solution of the segmented copolymer according to a solution polymerization process which is followed by incorporating therein from 0.01 to 5% by weight of the copolymer of a stabilizer selected from acid halides and anhydries of organic carboxylic acids. These stabilized solutions can be stored for extended periods of time without gelation or precipitation. These solutions can be used as such or modified with other solvents and spun so as to yield fibers of improved uniformity and optimum properties.

Case H filed by Bell, Kibler and Smith is related to their earlier U.S. application Ser. No. 166,155, filed Jan. 15, 1962 (now U.S. Patent No. 3,238,178, patented on Mar. 1, 1966), and covers new and improved spandex fibers of segmented polyurethane copolymers in which stabilizers are present, the copolymers being those described in Cases A, B, and C and also including those segmented copolymers derived from polyesters and poly-(ester-ethers) as well as polyethers, where the urea segment comprises from about 2 to 25% by weight of the copolymer. Case H is limited to the use of functionally aliphatic diisocyanates and diamines (if not replaced by water). Case H provides stabilized characteristics which advantageously supplement the nonyellowing properties inherent in the copolymers of Cases A, B and C as fibers, films, and other shaped articles. The stabilized copolymers include a class (1) additive and usually at least one other additive of the following five classes of additives:

(1) From 0.1% to 10% by weight of the segmented copolymer of a 2,4,6-trialkylphenol stabilizer wherein the sum of the carbon atoms in all of the three alkyl radicals is from 20 to 60, (2) Optionally from 0.1% to 5% of a thioester which is a mono or dihydric alcohol ester of thiodipropionic acid or thiodibutyric acid in which the monohydric alcohol radicals are present in simple esters as alkyl radicals having from 12 to 20 carbon atoms and the dihydric alcohol radicals are present in polyesters as alkylene radicals having from 2 to 20 carbon atoms, said polyester having at least two repeating units and a molecular weight of from about 400 to about 4000, (3) Optionally from 0.1% to 2% of an organic phosphite having at least 2 organic radicals each of which has from 1 to 40 carbon atoms, especially organic radicals composed of carbon atoms, hydrogen atoms, and which optionally may include intralinear —O— or —S— atoms between carbon atoms, said phosphites being monomeric or polymeric in molecular structure, (4) Optionally from about 1% to about 15% of an aliphatic amine having a molecular weight above about 280 which is defined by U.S. Patent 2,999,839, (5) Optionally from 1% to 30% of titanium dioxide and/or one or more other inorganic pigments.

The sum of the percentages of the first four classes of additives is not to exceed about 15% based on the weight of the segmented copolymer.

Spandex fibers covered by Cases A, B, and C, which are also among those included in Cases D–H, inclusive, are generally characterized in that:

(1) They have a tenacity of at least 0.25 g./den., (2) They do not break when heated for about 5 sec. under a tension of 0.02 g./den. at about 150° C., (3) They have an inherent viscosity of at least 3.0 when dissolved in 60% phenol and 40% tetrachloroethane. The inherent viscosities are measured using solutions at about 25° C. where the concentration is from about 0.02 to 0.5 gram per 100 ml. of solution. Usually the concentration is 0.25 g./100 ml. except that a lesser concentration is employed when the solubility in 60% phenol and 40% tetrachloroethane is not sufficient. The slope of the curve representing inherent viscosities at various concentrations is generally rather flat; thus, the corresponding intrinsic viscosity is usually only slightly different from the values given for inherent viscosity. The procedural details for measuring inherent viscosities are given by K. Izard in Journal of Applied Physics, vol. 20, p. 564 (1949). Further details are given by Schulken and Sparks in Journal of Polymer Science, vol. 26, p. 227 (1957), (4) They have a permanent set of less than 25% based on their original length, in 1 minute and less than 15% in 60 minutes after releasing the tension following (a) elongation to 4 times their original length at the rate of at least 4,000% per minute, (b) thereafter allowing immediate contraction to 2.5 times their original length, (c) holding at this length for 16 hours at room temperature, and (d) then releasing the tension, (5) When released after elongation to 3 times their original length at the rate of about 1,000% per minute, the stress at 2 times their original length during their return cycle is greater than 0.010 g./den., (6) When released after elongation to 5 times their original length at the rate of at least 4,000% per minute, they are capable of recovering at least 95% of their elongation within one minute, (7) When released after elongation to 1.5 times their original length at the rate of about 100% per minute, they are capable of recovering at least 97% of their elongation within one minute, (8) They retain substantially their original color after 3 cycles of gas exposure according to AATCC standard test method 23–1962, cf. AATCC Technical Manual, Part II–B–73, vol. XXXIX, 1963, "Colorfastness to Oxides of Nitrogen in the Atmosphere."

The segmented polyurethane copolymers of this invention can be prepared by various processes as described in the references cited above. However, it is considered especially advantageous to employ the following dual-operation process which is considered especially novel with respect to (a) those features covered by Cases E, F and G, (b) the combination of reactants, their proportions, the molecular weight of the macrodiisocyanate and the aliphatic nature of the isocyanate linkages as covered by Cases A, B and C, and (c) the nature of the polyether employed as covered by Cases C and D. The two basic operations of the overall process are as follows:

FIRST PROCESS OPERATION

A macrodiisocyanate is prepared by heating for from 2 to 10 hours at about 0°–175° C., optionally in the presence of a catalyst, under an inert atmosphere, a mixture of a diisocyanate and a polyether, in a mole ratio of from about 1.3 to 1 to about 10 to 1. The moles of remaining diisocyanate and macrodiisocyanate produced are calculated from the proportions of the reactants and the kinetics of the reaction as covered by Case G in particular.

Poly(ester-urethane-ureas) and poly(ester-ether-urethane-ureas) can be similarly prepared by replacing the polyether with an analogous hydroxyl-terminated polyester or poly(ester-ether) which can also be designated HO—P—OH as described in U.S. 3,097,192 such as polyethylene adipate, polyneopentyl sebacate, etc., including polyesters of hydroxycarboxylic acids where the carboxy end groups are terminated with a glycol, e.g., the polyester of 6-hydroxyhexanoic acid terminated with diethylene glycol, neopentyl glycol, 1,4-cyclohexanedimethanol, 1,4-butylene glycol, etc. Useful polyesters are described in U.S. Patent No. 3,097,192 in column 4 from line 40 to line 4 of column 5 and in U.S. Patent Nos. 2,933,477 and 2,933,478.

With respect to this first operation, the moles of unreacted diisocyanate remaining in the macrodiisocyanate reaction mixture can be removed partially or entirely by solvent extraction, distillation or by other process steps as covered by Case G. This is especially advantageous when the ratio of diisocyanate to polyether is greater than about 2 to 1, i.e., 1.8 or greater.

SECOND PROCESS OPERATION

A segmented polyurethane copolymer is prepared by dissolving the macrodiisocyanate, which may include unreacted diisocyanate, in a solvent, which is also a solvent for the segmented polyurethane copolymer being produced, and either (a) water is added at an elevated temperature or (b) a diamine solution in a solvent which may also be a solvent for the segmented polyurethane copolymer is added, or (c) a combination of (a) and (b) is employed. In some cases it is advantageous to gradually add the diamine over a period of from 5 minutes to 5 hours; however, it can be added within a few seconds, especially when a continuous process is employed. With regard to either the addition according to (a), (b) or (c) as just described, the overall ratio of amine radicals to isocyanate radicals is from about 0.7 to about one. The overall ratio may be seemingly less than 0.7 in some cases where water is introduced during the spinning of fibers from a solution of such a segmented copolymer, or while curing in contact with air having a significant relative humidity. When a non-hindered aliphatic diamine is being added it is advantageous to employ a temperature of 55°–60° C. or higher, i.e., about 60°–200° C., during the addition of the latter half of the nonhindered aliphatic diamine according to the process as covered by Case E. When water is added according to (a) or (c) as described above, the amount of water theoretically required can be calculated based upon the amount of isocyanate radicals which theoretically need to be converted to amine radicals so as to be available for reaction with the unconverted isocyanate radicals. The actual amount of water is advantageously two to twenty or more times the theoretical amount (can be up to 100 times) since the conversion step is relatively quite slow and the presence of excess water presents no particular difficulty in many solution spinning processes.

With respect to the second operation the solution of segmented copolymer which is produced can be stabilized against gelation or precipitation by adding up to 5% by weight of the segmented copolymer of an anhydride or an acid halide of an organic acid as covered by Case F.

Stabilizers as covered by Case H can be added to the solution of segmented copolymer prior to spinning spandex fibers. Other solvents can be added to the solution in order to form a spinning dope of optimum properties. Various spinning procedures are described in the references cited above for preparing spandex fibers, e.g., U.S. 3,111,368; moreover, such fibers can be used for various purposes as illustrated by U.S. 3,017,740, U.S. 3,038,295, U.S. 3,092,953 and U.S. 3,111,805, among others.

Most advantageously this invention pertains to an improved process for preparing segmented polyurethane copolymers capable of forming elastomeric fibers having an elastic recovery from 50% elongation which is above 90%, a stress decay well below 20%, and other advantageous properties as described herein, said copolymer having an essentially linear structure and being a segmented urea/urethane/HOPOH copolymer wherein P represents the polymeric residue of a low melting hydroxyl-terminated polymer selected from the group consisting of polyethers, polyesters, poly(ester-ethers) and urethane-lnked oligomers thereof, said segmented copolymer having a polymer melt temperature above 150° C. and an inherent viscosity of at least 2.0 when dissolved in 60% phenol and 40% tetrachloroethane, said copolymer consisting essentially of a multiplicity of urea segments containing at least one repeating unit of a fiber-forming polyurea, said repeating unit being of the formula:

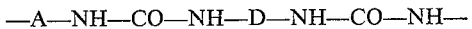

wherein —A— is the bivalent organic radical of an organic diisocyanate having the formula: OCN—A—NCO, and wherein —D— is the bivalent organic radical of an organic diamine having the formula: $NH_2$—D—$NH_2$, said polyurea as an independent fiber-forming polymer having a melting point of at least 200° C. in the fiber-forming molecular weight range above about 10,000, essentially all of said urea segments being connected to said polymeric residues by urethane linkages of the formula:

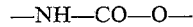

wherein the —NH— of said urethane linkage is attached to the terminal radical —A— of said urea segment and the —CO— of said urethane linkage is attached to the terminal atom —O— of said polymeric residues, said polymeric residues being the radicals remaining after removal of the terminal hydroxyl groups of a polymer consisting essentially of a member selected from the group consisting of (1) a hydroxyl-terminated linear series of divalent hydrocarbon groups joined by at least one member selected from the group consisting of intralinear oxy and carboxy linkages, and (2) oligomers of said series joined by from one to ten

intralinear linkages wherein A is defined above, said polymer having a melting point below about 60° C. and a molecular weight in the range of from about 600 to about 12,000, said urea segments constituting from about 2 percent to about 40 percent by weight of said copolymer, said improved process comprising (I) forming a macrodiisocyanate by mixing said diisocyanate and said hydroxyl-terminated polymer at 0°–175° C. in a mole ratio greater than about 1.3 to 1, (II) treating said macrodiisocyanate to remove a substantial amount of the unreacted diisocyanate, and (III) admixing, in the presence of a solvent for said segmented copolymer, said treated macrodiisocyanate with at least one member selected from the group consisting of said diamine and water whereby the ratio of amine radicals to remaining isocyanate radicals is from about 0.7 to about one, said ratio being based upon the amine radicals from said diamine and from the conversion of isocynate radicals when water is present. When the solution is formed into a shaped object, such a fiber, the inherent viscosity of said copolymer should be at least 3.0. This is normally accomplished during the forming operation or soon thereafter due to contact with normal moisture in the atmosphere.

The mole ratio in Step I is advantageously at least 1.8 to 1 and in many situations it is preferred that it be 2 to 1 or higher.

The removal of at least 40 percent of the unreacted diisocyanate enables the preparation of solutions of the segmented copolymer which have substantially reduced tendency toward gelation. A significantly greater improvement is achieved when 60 percent is removed. In certain situations at least 80 percent is preferably removed. The percentage can be adjusted so as to achieve segmented copolymers having certain predetermined properties.

The extractive chemicals which can be employed to remove unreacted diisocyanate can be advantageously selected from the group consisting of hydrocarbons, acyl nitriles and acyl esters having 2 to 12 carbon atoms, which chemical is preferably a nonsolvent for the segmented copolymer to be produced.

These segmented polyurethane copolymers where the urea segment is composed of a single repeat unit can be represented by the general formula:

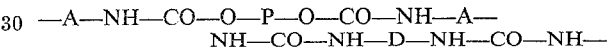

wherein the urea segment has the formula:

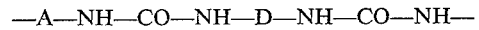

and the soft segment which contains the polyether glycol or other hydroxyl-terminated polymeric residue represented by the formula:

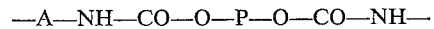

The A and D radicals can be different or the same in each repeat unit of the above formulas.

The soft segment $(GI)_x$ can be referred to as composed of glycol or other hydroxyl-terminated polymer (HO—P—OH) moieties "G" and diisocyanate moieties "I." P can include monomer, dimer, trimer and other oligomer residues as more fully explained elsewhere herein. The urea hard segment $(DI)_y$ can be considered as being composed of diamine moieties "D" and diisocyanate moieties "I." The values of $x$ and $y$ are on the average small integers which are at least 1. The preparation of the macrodiisocyanate from one mole of G and two moles of I can be schematically represented by the following assumed reaction:

(1) 

However, the resulting macrodiisocyanate as actually obtained was found by statistical calculations and confirmed by nuclear magnetic resonance (NMR) evaluation to be a mixture of monomer, oligomers, and unreacted diisocyanate as follows:

(2) 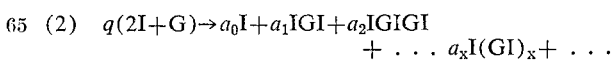

where $q$ represents a large number of molecules as ordinarily present in a reaction subject to statistical evaluation and $a_x$ is equal to the number of molecules of $I(GI)_x$. When $x$ becomes increasingly large the amount $a_x$ of the oligomer having such a value for $x$ becomes vanishingly small. Thus, the glycol or other polymeric moiety "P" is comprised of monomer "IGI" and a series of oligomers in diminishingly small proportions.

The average composition of the reaction product of 2 moles of I and one mole of G has been found by NMR to be approximately as follows ($x$ is 2):

(3) $\qquad 4I + 2G \rightarrow I + IGIGI$

When this average representation of the reaction mixture is solution polymerized with diamine "D," the segmented polyurethane copolymer obtained has an average composition approximately as follows ($y$ is 2):

(4) $\qquad 2D + I + IGIGI \rightarrow (DI)_2 GIGI$

Therefore the urea hard segment is on the average composed of two repeat units —$(DI)_2$— rather than —DI— as would theoretically be obtained if the assumed situation actually took place as depicted by Equation 1.

The above factual analysis explains the discovery of the advantages achieved by removing all of the unreacted diisocyanate "I" from the actual reaction mixture represented by Equation 2 having the average composition represented by Equation 3. When the resulting macrodiisocyanate is reacted with diamine the segmented copolymer obtained has approximately the following average composition where $x$ is 2 and $y$ is 1:

(5) $\qquad D + IGIGI \rightarrow DIGIGI$

This result can be achieved by the process as covered by Case G whereby the urea hard segments on the average contain only about one repeat unit and the soft segments contain on the average approximately two repeat units, i.e., the macrodiisocyanate is composed of various oligomers which approximate a dimer on the average. Such a segmented copolymer is more soluble, solutions thereof are more stable and optimum fiber-spinning conditions can be much more advantageously obtained as covered by Case G. With respect to Case C this facilitates the unexpectedly advantageous preparation of segmented copolymers having only 2 to 6% urea hard segments.

The approximate average situation set forth in Equation 4 can be more completely described by considering those situations where not all of the unreacted diisocyanate is removed, i.e., the situation depicted by Equation 5 is not achieved. When the reaction of I and G is in the ratio of 2 to 1, it can be considered that $x$ is approximately 2 on the average and the values of $y$ can be tabulated in relation to the amount of unreacted diisocyanate that has been removed:

| Percentage of Unreacted Diisocyanate Removed | Weight percent of hard segment —$(DI)_y$— where— | | | | |
|---|---|---|---|---|---|
| | $y$ is 1 | $y$ is 2 | $y$ is 3 | $y$ is 4 | $y$ is all values above 4 |
| None | 29 | 28 | 19 | 12 | 12 |
| 40 | 44 | 29 | 15 | 7 | 5 |
| 80 | 73 | 22 | 4 | 1 | |
| 90 | 85 | 13 | 2 | | |
| 100 | 100 | | | | |

The above tabulation is based upon the kinetics of the reaction as ascertained by NMR measurements and the percentage values calculated by statistical methods.

This table shows that at 40% removal of unreacted diisocyanate a significant reduction in long hard segments (i.e., where $y$ is greater than 3) is achieved. At 80% removal a very significant reduction in long hard segments is achieved leading to a very significant improvement in dope stability.

Similar statistics can be set forth for other situations where the ratio of I to G is different.

The preceding explanation is obviously subject to appropriate variations when different proportions of reactants are employed as will be readily comprehended by those having ordinary skill in this art.

Solvents which can be employed in conducting the solution polymerization process according to the second operation described above are those solvents which are relatively inert to the reactants. Suitable solvents for use in this process include N,N - dimethylformamide, N,N - dimethylacetamide, tetrahydrofuran, dimethylsulfoxide, and mixtures thereof as well as mixtures including other solvents. Dimethylformamide and dimethylacetamide are the preferred solvents for use in the practice of this invention, especially since solutions suitable for the spinning of fibers may be made directly in these solvents.

Among those solvents which can be employed in various situations individually or in various combinations are aliphatic halide such as methylene chloride, chloroform, 1,2 - dichloropropane, 1,1,2 - trichloroethylene, etc., aromatic halides such as chlorobenzene, bromobenzene, fluorobenzene, dichlorobenzenes, difluorobenzenes, etc., as well as analogs, homologs and isomers of the aliphatic and aromatic halides having from 1 to 12 carbon atoms; cycloaliphatic and aromatic hydrocarbons having from 6 to 12 carbon atoms such as cyclohexane, cumene, cymene, benzene, toluene, xylenes, mesitylene, etc., and isomers and homologs thereof; aliphatic, cycloaliphatic and aromatic ethers having from 4 to 12 carbon atoms such as dibutyl ether, diisopropyl ether, anisole, phenetole, 1,2-dimethoxyethane, 1,2 - diethoxyethane, diethylene glycol dimethyl ether, meta- and para-dioxanes, tetrahydrofuran, methyltetrahydrofuran, 8 - oxabicyclo[4.3.0]nonane, etc., and isomers, homologs and analogs thereof; aliphatic ketones such as diisopropyl ketone, diisobutyl ketone and isomers and homologs thereof having up to 12 carbon atoms and preferably at least 7 carbon atoms; hexamethylphosphoramide and related phosphoramide solvents; acyl nitriles such as acetonitrile, propionitrile, n-butyronitrile, isobutyronitrile, and isomers and homologs having from 2 to 12 carbon atoms; organic linear and cyclic esters having from 2 to 12 carbon atoms such as ethyl acetate, methyl acetate, isobutyl isobutyrate, ethyl propionate, butyrolactone, caprolactone, methyl benzoate, etc., and isomers and homologs thereof; N,N-dialkylacylamides having from 3 to 8 carbon atoms, such as dimethylacetamide, diethylacetamide, dimethylformamide, diethylformamide, dimethylpropionamide, tetramethylurea, including the cyclic analogs such as N-methylpyrrolidinone, and other isomers, homologs and related analogs; dimethyl sulfoxide, dimethyl sulfolane, and related isomers, homologs and analogs of such solvents containing an —SO— group. Some of the solvent constituents mentioned above can also be present in the extractive chemical compositions employed according to the process of Case G.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color.

The segmented copolymers described herein can also be employed in the form of elastic sheets, film, unwoven fabrics and various shaped articles in a manner analogous to that well known with respect to rubber products.

In Cases A, B and E–H, inclusive, the polyether glycols having the formula HO—P—OH may be homopolymers or copolymers. The essential features are that they be difunctional and have a melting point below 50° C. The polyethers are primarily poly(alkylene oxide)glycols but some of the oxygen may be replaced with sulfur atoms and/or some of the alkylene groups may be replaced with arylene or cycloaliphatic radicals. Even where the linkages and types of organic radicals are the same, the compositions may still be copolymers, such as a copolyether derived from more than one glycol. Copolymer formation is useful when a macromolecular homopolymer melts too high to be useful in the process. Copolymers usually melt lower and show less tendency to produce undesirable crystallization in this segment of the final copolymer. These macrointermediates have hydroxyl end groups capable of reacting with one of the monomeric constituents of the high melting component to form a urethane linkage, i.e., yielding a macrodiisocyanate.

The polyether glycols of Cases C and D are unexpectedly valuable in achieving surprisingly superior results. These glycols contain alkylene-cycloalkylene-alkylene radicals which have not been specifically mentioned in the preceding paragraph. However, such polyether glycols are considered within the scope of the formula HO—P—OH, which also includes oligomers.

Representative polyether glycols which may be used include poly(oxathiaalkylene glycols), such as poly(1,4-dioxa-7-thianonane), poly(1-oxa-4-thiahexane), and poly-(1,6-dioxa-9-thiahendecane); poly(alkylene glycols), such as poly(ethylene glycol), poly(propylene glycol), poly-(tetramethylene glycol), and poly(decamethylene glycol); polydioxolane and polyformals prepared by reacting formaldehyde with other glycols or mixtures of glycols, such as tetramethylene glycol and pentamethylene glycol. Some of the alkylene radicals in these compositions may be replaced with arylene or cycloaliphatic radicals.

The difunctional polyethers include poly(alkylene glycols), which may be represented by the formula shown in column 7 of U.S. Patent No. 2,929,804.

The melting points of the polyether glycols are below about 50° C. For example, poly(tetramethylene glycol) having an average molecular weight of 1,000 melts at about 20° C.; this homopolymer could also be employed as an oligomer having at least two internal

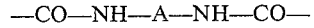

linkages, i.e., a trimer melting at below 50° C. Poly(tetramethylene glycol) of about 3,000 molecular weight melts at about 40° C. It can also be employed as a dimer, trimer or tetramer. The melting points of the polyether glycols are generally not sharp and may vary for a given molecular weight. Thus, some samples of the higher molecular weight polyether glycols (including oligomers) may have apparent melting points as high as 55° C. Preferred hydroxyl-terminated polymers comprise polymers of tetramethylene glycol; these include homopolymers and especially copolymers of tetrahydrofuran and 8-oxabicyclo-[4.3.0]nonane, cf. Case D.

The especially preferred diisocyanates which can be employed in all of Cases A–H, inclusive, are functionally aliphatic and most advantageously are those compounds solely composed of hydrogen atoms, up to about 17 carbon atoms and two isocyanate radicals, each of which isocyanate radicals is attached to a separate carbon atom which is attached to three other atoms by single covalent bonds of the type well known in hydrocarbon chemistry. Specific examples include 1,6-hexane diisocyanate and other alkane diisocyanates having from 4 to 17 carbon atoms and position isomers and homologs 1,4-cyclohexanebis(methyl isocyanate) and position isomers and homologs thereof as well as other alkylene-cycloalkylene-alkylene diisocyanates having from 7 to 17 carbon atoms, cyclohexane-1,4-diisocyanate and 2,2,4,4-tetramethyl-1,3-cyclobutane diisocyanate and position isomers and homologs of these two compounds as well as other cycloalkylene diisocyanates having from 5 to 17 carbon atoms, 1,8-menthanediisocyanate and position isomers and homologs thereof as well as other alkylene-cycloalkylene diisocyanates having from 6 to 17 carbon atoms, p-xylylene diisocyanate and position isomers and homologs thereof as well as other alkylene-arylene-alkylene diisocyanates having from 10 to 17 carbon atoms. The cycloalkylene radicals can advantageously include divalent cyclobutane radicals including alkylene-cyclobutylene-alkylene radicals and position isomers as well as homologs thereof having from 8 to 17 carbon atoms.

According to Cases D, F and G the diisocyanates which can be employed appear to include any aromatic diisocyanate whereby the polyurea hard segment can be present in an amount up to 40 percent by weight. Aromatic diisocyanates are useful because they form polyureas of extremely high melting point. A "hard segment" containing a unit of such a polymer provides a "tie point" for joining the low-melting, amorphous "soft segments," so that a polymer is produced having good elastic properties, i.e., a high tensile recovery and a low stress decay. Suitable diisocyanates include p-phenylene diisocyanate, 4,4'-biphenylene diisocyanate, p,p'-methylenediphenyl diisocyanate, p,p'-isopropylidenediphenyl diisocyanate, 2,4,6-trimethyl-1,3-phenylene diisocyanate, etc. The diisocyanates may contain other substituents, although those which are free from reactive groups other than two isocyanate groups are ordinarily preferred. Diisocyanates may be used in accordance with the process of Case G even though they may otherwise tend to produce polyester-urethane-ureas which would be difficultly soluble in solvents which are useful for spinning of fibers and would tend to yield gelled polymers according to prior art processes.

Since the prior art indicates that only certain aromatic diisocyanates would be suitable for preparing advantageous elastomeric fibers it would appear that any structure not specifically indicated to be useful would be unsatisfactory in view of the critical nature of the over-all molecular configuration of the desired segmented polyurethane copolymers. However, the concept embodied in Case G has to a great extent overcome the necessity for such limitations.

The prior art also takes into account the erroneous assumption that the formation of isocyanate-terminated polyethers (or polyesters) will be accompanied by no appreciable chain lengthening if two moles or more of diisocyanate are reacted per mole of polyether. If less than a 2:1 molar ratio were to be used, it was thought that a polyether-urethane would be formed with corresponding increase in molecular weight. The use of a 2:1 molar ratio of diisocyanate to polyether was preferred.

The errors in these assumptions are explained herein and in particular with regard to the process covered by Case G.

The diamines employed herein are advantageously diprimary diamines although a small proportion of a disecondary diamine may be included. Two or more diamines can be employed in admixture or in sequence so as to form copolymeric segments which may or may not occur in blocks of identical repeat units. Moreover, the diamine can be a linear polymer having an amino group on each end and containing internal linkages such as urea, amide, sulfonamide, urethane, ester, etc.

Preferred diamines which can be employed in all of Cases A–H, inclusive, are functionally aliphatic and most advantageously are those compounds solely composed of hydrogen atoms, up to about 17 carbon atoms, and two amino radicals (preferably —NH$_2$ radicals), each of which amino radicals is attached to a separate carbon atom which is attached to three other atoms by single covalent bonds of the type well known in hydrocarbon chemistry.

The particularly preferred diamines for Cases A and C are functionally nonhindered, whereas those which are required to be used for Case B are functionally hindered diamines in which there is a pronounced degree of steric hindrance at the amino groups. Cases D–H, inclusive, can employ either hindered or nonhindered diamines.

The hindered functionally aliphatic diamines of the first type are those where each of the amino radicals is attached to an alpha carbon atom which is attached to a beta carbon atom which is attached to three other carbon atoms. In other words there is a tertiary carbon atom in the β-position with respect to each amino radical. This tertiary carbon atom can be the same atom with respect to both of the amino radicals. Examples of these hindered diamines include 2,2,4,4-tetraalkyl-1,3-cyclobutanediamines where the alkyl radicals can be the same or different and contain from 1 to 4 carbon atoms, $\beta,\beta,\beta',\beta'$-tetraalkyl-polymethylenediamines where the alkyl radicals contain from 1 to 4 carbon atoms (two of which are positioned in $\beta$-relationship to each of the amine radicals) and there are from 4 to 10 carbons in the polymethylene chain as for example 2,2,3,3-tetramethyl-1,4-butanediamine, and 2,2-dialkyl-1,3-propanediamines where the alkyl radicals contain from 1 to 4 carbon atoms such as 2,2-dimethyl-1,3-propanediamine.

The hindered functionally aliphatic diamines of the second type are those where each of the amino radicals is attached to a carbon atom which is attached to three other carbon atoms. In other words there is a tertiary carbon atom in the $\alpha$-position with respect to each amino radical. Examples of these hindered diamines include 1,8-methanediamine and various homologs thereof as well as many other sterically hindered compounds.

The non-hindered functionally aliphatic diamines are those where neither of the carbon atoms in the $\alpha$- or $\beta$-position to the amino radical is a tertiary carbon atom. Examples of these diamines include hexamethylenediamine and those other alkanediamines having from 2 to 17 carbon atoms, 1,4-cyclohexanebis(methylamine) and position isomers and homologs thereof as well as other alkylene-cycloalkylene-alkylene diamines having from 5 to 17 carbon atoms, cyclohexane-1,4-diamine and position isomers and homologs thereof as well as other cycloalkylene diamines having from 3 to 17 carbon atoms, p-xylylenediamine and position isomers and homologs thereof as well as other alkylene-arylene-alkylene diamines having from 8 to 17 carbon atoms. The cycloalkylene radicals can advantageously include divalent cyclobutene radicals including alkylene-cyclobutylene-alkylene radicals and position isomers as well as homologs thereof having from 6 to 17 carbon atoms.

The position isomers mentioned in this specification include cis- and trans-isomers and various mixtures thereof as well as other position isomers such as those in ortho, meta or para positions, etc.

According to Cases D, F and G the primary diamines which can be employed may be aliphatic, alicyclic, aromatic, or heterocyclic diamines. It is required that these diamines be combined with suitable coreactants to form a urea which melts above 200° C. Suitable diamines include ethylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4-diaminobenzene, bis(p-aminocyclohexyl)methane, and many others. Derivatives of these diamines may also be used as long as the substituents do not interfere with the polymerization. For example, they may have hydrocarbon side chains or be substituted with halogens or nitro groups which are inert under the conditions used herein.

However, it is especially preferred to employ the functionally aliphatic diamines, especially as regards Cases A, B, C, E and H. These are limited to the nonhindered diamines in Cases A and C and to the hindered variety in Case B. Both varieties can be employed in Cases E and H. Of course, these functionally aliphatic diamines can also be employed in Cases D, F and G along with other types of diamines including functionally aromatic diamines such as tolylenediamine, heterocyclic diamines such as piperazine, substituted piperazines, and many others.

It is indicated in the prior art that for utility in fiber and filament applications, it is desirable to have elastic products which require no aftercuring or aftertreatment. In order to be suitable in textile applications for the replacement of rubber yarns, a synthetic elastic fiber should have the following properties as a minimum requirement: tensile recovery of 90% or more, stress decay of less than 20%, and fiber sticking temperature of over 150° C. It is readily apparent that the spandex fibers of the present invention are clearly quite superior with respect to the above minimum requirements. It would have been expected that the proportion of urea hard segments would have to constitute at least about 10% of the segmented copolymer since lower percentages would not be thought to have been capable of forming improved spandex fibers or of forming useful spinning solutions for making such fibers. Similar shortcoming would also have been expected with regard to using high molecular weight polyethers, whereas molecular weights up to 10,000 to 12,000 were unexpectedly found to give improved results. Moreover, the surprisingly great improvement as to low temperature properties achieved as particularly covered by Cases C and D was quite unexpected. Cases A–D and H cover new and improved copolymers and Cases E–G cover new and improved processes and spinning solutions which may also include prior art copolymers in Cases F and G.

This invention of Case G is concerned with the preparation of improved segmented copolymers which are much improved with respect to stability of the solution used for spinning the polymer to yield spandex fibers and the like. The type of stability of interest here is the stability of viscosity and homogeneity of the spinning solution or dope. An object of this invention is to prepare dopes or concentrated solutions of segmented copolymers which will maintain constant viscosity and homogeneity and be relatively free of gel or gel lumps for an extended period of time. The concentrated solutions preferably consist of 5 to 50% of the segmented copolymer with an especially preferred range of 8% to 30%. By extended period of time is meant at least one day and generally 10 days to several months.

British Patent 930,458 discloses a process for purification of isocyanate group-containing compounds which is essentially a process for extraction of unreacted diisocyanates from reaction products of diisocyanates and other compounds. This invention, although covering extraction of diisocyanates from reaction products of diisocyanates and at least one other compound, utilizes a different process for extraction. This invention discloses the extraction of diisocyanates from diisocyanate reaction products in which no solvent for the diisocyanate reaction products is used as is done in British Patent 930,458. Also, this invention discloses the use of chemicals which are solvents for the diisocyanates and nonsolvents for the macrodiisocyanate reaction products, whereas British Patent 930,458 discloses the use of the same chemicals as solvents for the diisocyanate reaction products. Propylene carbonate is an example of such a chemical.

Also this invention is primarily concerned with the preparation of gel-free dopes for spinning segmented copolymers to give spandex fibers. The removal of the free diisocyanate is only a step, although an important step, in this process. Moreover, the unreacted diisocyanate may be removed by any one of a number of possible processes i.e., extraction, diffusion dialysis, distillation, chomatography, etc. The method of removal of the unreacted diisocyanate is immaterial so long as the macrodiisocyanate (sometimes called prepolymer) itself is left essentially unchanged with respect to its polymerization behavior and its characteristics in the elastomeric segmented linear copolymer.

Hereinabove a discussion is puresented as to the theoretical considerations involved in the process of the instant Case G. It should be recognized that unsymmetrical diisocyanates such as 2,4-tolylene diisocyanate will not have equally reactive groups. In this situation the statistical analysis of the products will predict a different ratio of products which can be confirmed by NMR or other suitable analysis.

It is obvious that it is not necessary to remove 100% of unreacted diisocyanate to make a large difference in the number of DI repeat units called $y$ hereinabove. Long segments are more likely to cause gelation than are an equal weight of shorter segments. Thus, 80% removal can make a very significant improvement in dope stability because of the marked reduction in segments containing several DI units.

Most of the elastomers which would have the best properties without removal of any unreacted diisocyanate are most likely to form dopes which would gel in a very short time and become unsuitable for spinning into fibers. It appears that the "multiunit" polyurea segments $(DI)_y$ are responsible for dope gelation. Unexpectedly it was found that these long hard segments were not necessary for high-melting point in the segmented copolymer and high power and high tenacity in the fiber. This is contrary to the teaching of the art which has generally taught that a hard segment of 10 to 40 weight percent was necessary to impart these necessary properties to segmented elastomers.

According to the teachings of this invention, the monomeric diisocyanate is extracted or otherwise removed from the macrodiisocyanate which is then chain extended with diamine, water, hydrazine, hydrazides, etc. in the usual manner. This produces an elastomer with hard segments of only unit length. The resulting dopes are stable for more than several months in most cases as compared to less than one hour without extraction in other cases. Two unexpected achievements result from this extraction: (1) stable dopes can be prepared at concentrations of over 25% solids compared to less than 10% without extraction, which means the processing can be much more economical, and (2) good properties can be obtained with less weight percent of hard segments since the hard segments are more efficiently used in extracted systems.

In determining the ratio of diisocyanate to glycol or other polymer to be used in preparing the macrodiisocyanate it should be pointed out that as the ratio increases, the amount of unreacted diisocyanate in the product increases and the amount of macrodiisocyanate containing 2 or more glycol units decreases. Thus, if it is desired to prepare a very uniform polymer to make the most efficient use of the diisocyanate in the hard segment, a ratio of 5 to 1 up to 40 to 1 can be used to produce a macrodiisocyanate of essentially one unit in length. The excess monomeric unreacted diisocyanate can then be removed according to the teachings of this invention. If a macrodiisocyanate made in this way is chain-extended with diamine in the normal way a segmented copolymer is produced which closely approaches the ideal of unit lengths ($x$ and $y$ are both 1) in both hard and soft segments. Of course, it is also possible to partially extract the diisocyanate or add known amounts of organic diisocyanate and thus control the distribution of hard segment lengths.

Chemicals used for extraction of unreacted diisocyanates from the macrodiisocyanate should be selected according to the solubility characteristics thereof and of the unreacted diisocyanate. The main prerequisite is that the chemical be a nonsolvent for the macrodiisocyanate and a solvent for the diisocyanate. The extractive chemical used should be inert especially as far as reacting with isocyanate groups is concerned. Chemicals which may be used include the straight chain and cyclic hydrocarbons having from 4 to 20 carbon atoms such as hexane, heptane, and cyclohexane. Other chemicals which may be used include propylene carbonate, acetonitrile, etc.

Mixtures of these extractive chemicals (inert extractants) can be used to gain differential solubility control. For instance, in some cases hexane itself may not have sufficient solvent power for the diisocyanate to extract it from the macrodiisocyanate. However, addition to the hexane of a certain amount of acetone or other good solvent can increase the solvent power of the hexane so that the desired extraction is achieved. Of course, the addition of too much acetone or the like may produce a solvent for the macrodiisocyanate whereby separation cannot be achieved.

Gelation in a dope usually can be ascertained by visual observation of the way the dope behaves when a glass jar which is partially filled with the dope is slowly turned from one side to the other. Since a gelled dope does not spin properly, gelation may be detected during processing of the dope. However, for a simple quantitative measurement a laboratory method was developed. This method consists of measuring the shear stress on the dope as a function of time in a rheogoniometer. Viscosity is a function of shear stress. This instrument is described in some detail in Van Wazer et al. Viscosity and Flow Measurement, Interscience, New York, 1963, p. 113, and by Eirich, Rheology, Theory and Applications, vol II, Academic Press, New York, 1958, chapter 13.

The rheogoniometer is essentially a cone and plate rheometer which may be used to measure viscosity of a fluid. The sample occupies the gap between a very flat horizontal cone and a plate which is essentially parallel to the cone. The cone is made to rotate on its vertical axis so that the fluid is sheared between the cone and plate. The torque on the upper plate which is generated by the fluid couple to the rotating cone is determined by measuring the deflection of a torsion spring which holds the upper plate in place. The torque is related to the shear stress; the rate of rotation is related to the shear rate. By using the appropriate well-known equations, the actual shear stress and shear rate on the fluid may be calculated. Viscosity is by definition the ratio of the shear stress to the shear rate. For the purpose of this test a constant shear rate of 8.6 sec. $^{-1}$ was used. The curves in FIGURE 1 are based upon this shear rate.

In the rheogoniometer the extent of gelation can be measured by evaluating the curves of shear stress vs. time as shown in FIGURE 1. If little gelation has occurred then the curve appears as curve B. If gelation is present in the dope the curve has a very pronounced peak at about .1 to .7 sec. as shown for the gelled dope in FIGURE 1, curve A. The stress decay shows the partial destruction of the gel "structure." Gelation is destroyed or reduced by adequate shear treatment but it starts reforming immediately at a rate which depends on the gelling tendency of the system. A curve showing a typical reformation of gel is shown in FIGURE 2 where the relative "peak" size is plotted as a function of time. Good dope made from a macrodiisocyanate containing no unreacted diisocyanate show no evidence of a "peak" formation even after four months.

This invention can be further illustrated by the following examples of preferred embodiments although it will be understood that these examples are included merely for purposes of illustration and are not intended to limit the scope of the invention unless otherwise specifically indicated:

*Example 1.*—Extraction process as to segmented copolymer of copoly(THF+9% OBN), p-xylylene diisocyanate and p-xylylenediamine 462.9 grams (0.1045 mole) of a copolyether glycol of 4425 molecular weight was prepared from tetrahydrofuran (THF) and 9 mole percent 8-oxabicyclo[4.3.0]nonane (OBN) and was mixed with 39.33 g. (0.2092 mole) of p-xylylene diisocyanate and heated under nitrogen with stirring at 97° C. for 4 hours. Analysis of the macrodiisocyanate by nuclear magnetic resonance (NMR) showed 25% unreacted diisocyanate, 51% once-reacted diisocyanate (only one of the isocyanate radicals of a diisocyanate molecule has reacted with a hydroxyl of the copolyether) and 24% twice-reacted diisocyanate (both of the isocyanate radicals of a diisocyanate molecule have reacted with a hydroxyl from two copolyether molecules). The macrodiisocyanate, 141.7 g., was extracted 3 times with freshly distilled anhydrous propylene carbonate first using 2 ml./g., then 1 ml./g. and then 0.5 ml. per gram of macrodiisocyanate. NMR analysis on the extracted macrodiisocyanate showed 4% unreacted diisocyanate, 67% once-reacted diisocyanate and 30% twice-reacted diisocyanate. A sample of the extracted macrodiisocyanate, 43 g. containing approximately 43 ml. propylene carbonate was dissolved in 265 ml. freshly distilled N,N-dimethylacetamide (DMAc). While heating the macrodiisocyanate solution from 70–87° C. and stirring under nitrogen, 0.62 g. p-xylylenediamine in 100 ml. DMAc was added dropwise over a 21-min. interval. The solution thickened rapidly to approximately 120 poises and 1 ml. of acetic anhydride was added for stabilizing. After addition of 0.45 g. (1% by weight of polymer) of 2,6-didodecyl-p-cresol (DDPC) and 0.22 g. (0.5% by weight of polymer) of dilauryl 3,3'-thiodipropionate (DLTDP) as antioxidants, the dope was wet spun into a water bath heated to 70° C. The elastic fibers had tenacity of 0.41–0.43 g./den., elongation 409–490% and 98% recovery from 400% elongation.

A sample of the dope was allowed to cool to room temperature immediately after preparation and was in a spinnable condition after 10 weeks. Dopes prepared in the same manner using identical reactants but from nonextracted macrodiisocyanate gel to a nonspinnable state in a few hours.

*Example 2.*—Extraction process as to segmented copolymer of copoly (THF+9% OBN), p-xylene diisocyanate and 1,6-hexanediamine A 4100 molecular weight copolyether, prepared as described in the previous Example 1, was reacted with 2 mole proportions of p-xylylene diisocyanate under the conditions described in the previous example to give a macrodiisocyanate. NMR analysis showed the macrodiisocyanate contained 21, 55 and 24 percent, respectively, of unreacted, once-reacted, and twice-reacted diisocyanate.

The macrodiisocyanate (72.35 g.) was extracted 3 times with anhydrous acetonitrile using 3 ml. of acetonitrile per gram of macrodiisocyanate for each extraction. NMR analysis on the extracted macrodiisocyanate showed no detectable unreacted diisocyanate, 59.5% once-reacted and 40.5% twice-reacted diisocyanate.

The extracted macrodiisocyanate containing 77 ml. of acetonitrile, was dissolved in 520 ml. freshly distilled DMAc. This solution was stirred and heated from 50–61° C. under nitrogen while adding dropwise over 13 min. 0.91 g. 1,6-hexanediamine in 97 ml. of DMAc. A viscous dope of 134 poises at 45° C. was obtained and 1.25 ml. of acetic anhydride was added to prevent further build-up. After addition of 0.73 g. DDPC, 0.37 g. DLTDP and 2.92 g. TiO₂ (33% in DMAc) the dope was wet spun into water heated to 60° C. The elastic fibers had tenacity 0.46–0.55 g./den., elongation 417–485% and 97.9–98.3% elastic recovery from 400% elongation.

A sample of the dope, allowed to cool to room temperature immediately after preparation, was in a spinnable condition after 11 weeks and had a viscosity of 488 poises at 24° C.

*Example 3.*—Extraction process as to segmented copolymer similar to Example 2

A macrodiisocyanate was prepared as described in Example 2 using the 4100 molecular weight copolyether glycol and p-xylylene diisocyanate and contained 21, 52 and 27 percent unreacted, once-reacted and twice-reacted diisocyanate.

After three extractions of 82.13 g. of the macrodiisocyanate using 2, 1 and 0.5 ml. of freshly distilled propylene carbonate per gram of prepolymer, NMR showed no detectable monomeric diisocyanate in the second and third extractions and only 9% after the first extraction.

The macrodiisocyanate, extracted three times, was dissolved in 554 ml. of freshly distilled DMAc. This solution was stirred and heated from 50–62° C. under nitrogen while adding dropwise over 11 min. 1 g. of 1,6-hexanediamine in 90 ml. of DMAc. A viscous dope of 244 poises at 60° C. was obtained and stabilized with 1.5 ml. of acetic anhydride. After addition of 1% (0.83 g.) DDPC, 0.5% (0.42 g.) DLTDP and 4% (3.32 g.) TiO₂, the dope was wet spun into water at 60° C. and gave elastic fibers with excellent properties.

A sample of the dope allowed to cool to room temperature immediately after preparation was in a spinnable condition after 10 weeks and had a viscosity of 1,020 poises.

*Example 4.*—Extraction process as to segmented copolymer of copoly (THF+6% OBN), m-xylylene diisocyanate and m-xylylenediamine A macrodiisocyanate was prepared as described in Example 2 using the 4100 mol. wt. copolyether glycol except that m-xylylene diisocyanate was used instead of the para isomer. The macrodiisocyanate (33.4 g.) after extraction three times using 3 ml. of freshly distilled acetonitrile per gram of macrodiisocyanate (sometimes also called prepolymer) contained approximately 34 ml. of acetonitrile and was dissolved in 156 ml. of freshly distilled DMAc. This solution was stirred and heated at 49° C. under nitrogen while adding dropwise over 15 min. 0.4 g. m-xylenediamine. The viscous dope stabilized with 0.5 ml. of acetic anhydride had a viscosity of 920 poises at 320° C. and was wet spun into water heated to 60° C. The resulting elastic fiber had tenacity 0.29–0.35 g./den., elongation 350–473% and 97.2% elastic recovery from 400% elongation.

Rheogoniometric readings on dopes prepared from extracted and unextracted prepolymers of the above composition showed the dope prepared from extracted prepolymer was more stable than dope prepared from unextracted prepolymer.

*Example 5.*—Extraction process as to segmented copolymer similar to Example 2

A macrodiisocyanate was prepared by combining 107.89 g. (0.03597 mole) of a copolyether glycol of 3000 mol. wt. as described in Example 1 with 13.52 g. (0.07194 mole) of p-xylylene diisocyanate and heated under nitrogen with stirring at 95° C. for 4 hours.

A sample of the above macrodiisocyanate was extracted as described in Example 4 with acetonitrile and gave by NMR analysis 0.0, 63.7 and 36.4%, respectively unreacted, once reacted and twice reacted diisocyanate.

The extracted macrodiisocyanate, 80 g. containing 30 ml. acetonitrile was dissolved in 560 ml. freshly distilled DMAc. This solution was stirred and heated from 64–78° C. under nitrogen while adding dropwise over 48 min. 1.44 g. 1,6-hexanediamine in 97 ml. DMAc. A viscous dope resulted and was stabilized with 1.5 ml. acetic anhydride. After addition of 0.82 g. DDPC and 0.41 g. DLTDP the dope was wet spun into water heated to 70° C. The elastic fibers had tenacity .52–.81 g./den.

A sample of the dope allowed to cool immediately after preparation had a viscosity of 600 poises at 23° C. This same sample held for 10 weeks at room temperature was in a spinnable condition and had a viscosity of 532 poises at 26° C.

Example 6.—Extraction process as to segmented copolymer similar to Example 2

A macrodiisocyanate was prepared by combining 445.0 g. (0.1141 mole) of a copolyether glycol of 3900 mol. wt. as described in Example 1 with 42.90 g. (0.2282 mole) of p-xylylene diisocyanate and heated under nitrogen with stirring at 96° C. for 4 hr. The resulting macrodiisocyanate was found by titration to contain 4.14% diisocyanate calculated as p-xylylene diisocyanate. NMR analysis showed the prepolymer to contain 20, 54 and 26%, respectively unreacted, once reacted and twice reacted diisocyanate.

The macrodiisocyanate after extraction three times using 3, 2, and 2 ml. of freshly distilled acetonitrile per gram of prepolymer had an NMR analysis of 0.0, 62, and 38% respectively of unreacted, once and twice reacted diisocyanate and contained 2.30% diisocyanate calculated as p-xylylene diisocyanate.

A sample of the extracted macrodiisocyanate (106 g.) was dissolved in 472 ml. of freshly distilled DMAc. While heating this solution from 55–68° C. and stirring under nitrogen, 1.24 g. of 1,6-hexanediamine in 100 ml. DMAc was added dropwise over a 32 min. interval. The solution thickened rapidly on addition of diamine to a viscosity of 72 poises and 1 ml. of acetic anhydride was added for stabilization. After addition of 1.07 g. DLTDP, 2.14 g. DDPC, and 4.28 g. $TiO_2$ (33% in DMAc) the dope was wet spun into a 60° C. water bath. The resulting fibers with less than 3.6% hard segment had good elastic properties.

The following table lists the glycol molecular weight and the diamines and diisocyanates used in preparing the elastomers described in Examples 1–6 hereinabove.

| Examples | Mol. Wt. of Glycol | Diisocyanate | Diamine |
| --- | --- | --- | --- |
| 1 | 4,425 | p-Xylylene | p-Xylylene. |
| 2 | 4,100 | do | 1,6-hexane. |
| 3 | 4,100 | do | Do. |
| 4 | 4,100 | m-Xylylene | m-Xylylene. |
| 5 | 3,000 | p-Xylylene | 1,6-hexane. |
| 6 | 3,900 | do | Do. |

The next table gives the properties of yarns prepared as described in Examples 1–6. All fibers were boiled 1 hr. in water.

| Ex. | Tenacity, G./Den. | Elongation, percent | Elastic Recovery, percent, From 400% | Power,[a] G./Den. | Return Power,[b] G/Den. | Permanent Set, Percent After— | |
| --- | --- | --- | --- | --- | --- | --- | --- |
| | | | | | | 1 Min. | 60 Min. |
| 1 | 0.43 | 409 | 98.0 | .362 | .019 | 10 | 7.5 |
| 2 | 0.46 | 417 | 97.9 | .392 | .020 | 9 | 6.5 |
| 3 | 0.60 | 508 | 97.7 | .320 | .018 | 11 | 8 |
| 4 | 0.35 | 446 | 97.2 | .274 | .016 | 25.5 | 19.5 |
| 5 | 0.81 | 393 | 96.8 | .600 | .020 | 13 | 10 |
| 6 | 0.52 | 496 | 97.4 | .198 | .018 | 10 | 7 |

[a] At 400% elongation, 2nd cycle.
[b] At 100% elongation after 2nd cycle to 400%.

Example 7.—Extraction process as to segmented poly(triethylene adipate), p-xylylene diisocyanate and 1,6-hexanediamine A macrodiisocyanate was prepared by reacting 131.40 g. of a 1742 molecular weight hydroxyl-terminated polyester prepared from adipic acid and triethylene glycol with 22.4 g. p-xylylene diisocyanate under nitrogen at 110° C. with stirring for 17.75 hr. The resulting macrodiisocyanate contained 7.71% diisocyanate calculated as p-xylylene diisocyanate and NMR gave 23, 54 and 23%, respectively, unreacted, once reacted and twice reacted diisocyanate. After extraction of 28.2 g. of macrodiisocyanate 3 times using 85 ml. cyclohexane per extraction NMR gave 11, 58 and 31%, respectively, unreacted, once reacted and twice reacted p-xylylene diisocyanate.

The extracted macrodiisocyanate was dissolved in 200 ml. N,N-dimethylacetamide. To this solution was added with stirring under nitrogen 0.8 g., 1,6-hexanediamine in 30 ml. N,N-dimethylacetamide, over a 15 min. interval. The resulting viscous dope was cast into a film which had good elastic properties when dry and was also capable of being spun into elastomeric fibers having similarly good properties.

Example 8A.—Nonextraction process for segmented copolymer similar to Example 2

A macrodiisocyanate was prepared by reacting 4077.5 g. of a 4425 molecular weight copolyether glycol with 346.5 g. of p-xylylene diisocyanate at 95° C. for 4 hr. under nitrogen with stirring. The macrodiisocyanate (sometimes also called prepolymer) 137.9 g. was dissolved in 960 ml. of anhydrous N,N-dimethylacetamide. This solution was heated to 70° C. while stirring under nitrogen. To the heated solution was added dropwise 3.02 g. 1,6-hexanediamine in 240 ml. N,N-dimethylacetamide over a 21-min. interval while raising the temperature to 80° C. The viscous dope had a viscosity of 35.2 poises at 80° C. and was stabilized with 4 ml. of acetic anhydride to prevent further buildup. After addition of 3.0 g. of didodecyl-p-cresol and 0.7 g. dilauryl thiodipropionate, the dope was wet spun into a 70° C. water bath. Elastic properties of the resulting fiber are shown in the table below Example 8B.

Example 8B.—Extraction process for comparison with Example 8A

A polymer dope was prepared and spun in the same manner as above but using extracted prepolymer. Reactants were the same except that the unreacted diisocyanate was extracted from the prepolymer. Elastic properties of the resulting fiber are shown in the following table which compares physical properties of elastomeric fibers prepared from extracted and unextracted macrodiisocyanate which is called "prepolymer" in the table below:

| | Example 8A, Nonextracted Prepolymer | Example 8B, Extracted Prepolymer |
| --- | --- | --- |
| Tenacity, g./den | 0.83 | 0.72 |
| Elongation, percent | 626 | 514 |
| Elastic recovery from 400% elongation, percent | 97.8 | 99.0 |
| Power at 400% (2nd cycle), g./den | .308 | .372 |
| Return power at 100% elongation after 2 cycles to 200%, g./den | .022 | .025 |
| Permanent set, percent after— | | |
| 1 min | 10.5 | 4.5 |
| 60 min | 7.5 | 2.5 |

It can be seen that the properties of fiber prepared from extracted prepolymer (macrodiisocyanate) are approximately equal to those prepared from nonextracted prepolymer and in some cases extraction of prepolymer improves properties.

The polymer dope prepared from nonextracted prepolymer and described in Examle 8A was stable for only about 3 hr. after which time it was in a nonspinnable state or gelled. Rheogoniometric curves for dopes prepared from nonextracted and extracted prepolymer give curves typical to those shown in FIGURE 1. An unstable dope or a dope prepared from prepolymer which has not been extracted and contains monomeric or unreacted diisocyanate will gel to a nonspinnable state in 2 to 3 hr. or less. Gelation in such dopes begins as soon as the dope is prepared and as a result, even though fibers may be spun before gelation is complete, the fibers decrease in quantity as gelation increases and finally in about 3 hr. the dopes gel at which time they cannot be spun. The curve labeled A for gelled dope in the drawing is typical of such unstable dopes which reach a maximum and decline.

The curve labeled B for stable dope in FIGURE 1 which reaches a maximum and levels off is typical of a dope prepared from prepolymer in which the unreacted or monomeric diisocyanate has been extracted. Such polymer dopes are stable or nongelling for long periods of time (2 or 3 months longer) and may be spun for long periods of time producing fiber of good reproducible quality.

*Examples 9–12.*—Distillation extraction process for segmented copolymers similar to Example 2

Unreacted diisocyanate can also be removed from macrodiisocyanates (prepolymer) by distillation in distillation apparatus, i.e., a turbofilm evaporator available from Rodney-Hunt Company. This technique was used and is capable of removing all unreacted diisocyanate as in the solvent extraction process described in Example 2 above. Distillation is an advantageous technique for removing unreacted diisocyanate from prepolymer since it does not involve the use of large volumes of anhydrous solvents and may be more economically feasible on a large scale. Dopes prepared from prepolymer (macrodiisocyanate) in which the monomeric diisocyanate is removed by distillation are as stable as those prepared from prepolymer in which the monomeric diisocyanate is removed by extraction.

The following table gives the physical properties of some elastic yarn prepared from prepolymers in which the unreacted diisocyanate was removed from the prepolymers by distillation. Otherwise the composition of the segmented copolymers in Examples 9–12 essentially as described above in Example 2.

| Example Number | Molecular Weight of Glycol | Tenacity, G./Den. | Elongation, Percent | Elastic Recovery, Percent, From 400% | Power,[a] G./Den. | Return Power,[b] G./Den. | Permanent Set, Percent After— | |
|---|---|---|---|---|---|---|---|---|
| | | | | | | | 1 Min. | 60 Min. |
| 9  | 3,800 | 0.78 | 555 | 97.3 | .389 | .026 | 12   | 8.5 |
| 10 | 3,800 | 0.64 | 565 | 97.5 | .275 | .027 | 10.5 | 7.5 |
| 11 | 3,900 | 0.49 | 490 | 97.7 | .352 | .028 | 10.5 | 7.5 |
| 12 | 3,900 | 0.62 | 475 | 97.7 | .369 | .028 | 11   | 8   |

[a] At 400% elongation, 2nd cycle.
[b] At 100% elongation after 2nd cycle to 200%.

Example 13.—Extraction process as to segmented copolymer of copoly (THF+6% OBN), p-xylylene diisocyanate and 1,12-dodecanediamine A macrodiisocyanate (prepolymer) was prepared from 4100 molecular weight glycol as described in Example 1 using p-xylylene diisocyanate. The prepolymer after extraction with 3, 2 and 1 ml. of acetonitrile per gram of prepolymer contained 5, 70 and 25% respectively unreacted, once-reacted and twice-reacted, diisocyanate.

The extracted prepolymer was dissolved in 200 ml. DMAc and heated with stirring under nitrogen to 38° C. While raising the temperature of the prepolymer from 38–65° C., 0.68 g. 1,12-dodecanediamine in 54 ml. DMAc was added dropwise over a 17 min. interval. A viscous solution was obtained and 0.75 ml. acetic anhydride was added to prevent further build-up. After addition of 2% DDPC and 1% DLTDP, the polymer solution having a Brookfield viscosity of 254 poises at 38° C. was wet spun into a 60° C. water bath.

The dried as-spun fiber had the following properties:

| | |
|---|---|
| Tenacity, g./den. | 0.40–0.46 |
| Elongation, percent | 462–552 |
| Elastic recovery, percent from 400% | 97.1 |
| Power,[a] g./den. | .220 |
| Return power,[b] g./den. | 0.018 |
| Permanent set, percent after— | |
|   1 min. | 10.5 |
|   60 min. | 6.5 |

[a] At 400% elongation, 2nd cycle.
[b] At 100% elongation after 2nd cycle to 400%.

As explained above and illustrated by the working examples of Case F, the solution polymerization process is advantageously stabilized with respect to its solution viscosity when the segmented copolymer has achieved an inherent viscosity of at least about 2.0. This can be readily determined as to any particular example by ascertaining, according to well known means, the correlation between the solution viscosity in terms of its centipoise value in the solvent system being employed and the inherent viscosity of the segmented copolymer being prepared. By means of a few trial preparations, including the preparation of the desired shaped object such as a filament it can be readily ascertained what the optimum solution viscosity may be in order to produce a filament of a segmented copolymer having an inherent viscosity of at least 3.0 and other desired properties.

As explained above, while in solution the segmented copolymer could have an inherent viscosity of no more than about 2.0, although it could be much higher. Yet when it is formed into a filament its inherent viscosity could in some cases tend to increase. It is preferred that its final value in the form of a filament or other shaped object be at least about 3.0. Such an increase might be due to an uncontrolled continued polymerization in situations such as in cases E and G where no viscosity stabilizer may be present. An increase can also take place due to the presence of water during the wet spinning of fibers or while the spun fibers are exposed to an atmosphere containing a significant percentage of relative humidity.

For example, when the segmented copolymer solution as it is being prepared at 50° C. attains an optimum solution viscosity sufficient for efficient spinning at the predetermined lower spinning temperature, the solution may have a viscosity of 10,000 cp. at 50° C. during the latter part of the polymerization process, at which point the viscosity stabilizer according to Case F may be added, the solution cooled and then spun at 25° C., at which temperature its solution viscosity may be about 21,000 cp.

The most advantageous solution viscosity will depend on the spinning process employed, but is generally between 10,000 and 125,000 cp.

The inherent viscosity of the segmented copolymer while in solution will vary inversely with respect to variations of the concentration of segmented copolymer in the solution. For example, at a solids concentration of about 10% in DMAc, the inherent viscosity of the segmented copolymer could be about 4.0 at 15,000 cp. Whereas the inherent viscosity could be about 2 to 2.5 if the solids concentration were 25%.

Although the invention has been described in considerable detail with reference to certain preferred embodiments thereof, it will be understood that variations and modifications can be effected without departing from the spirit and scope of the invention as described hereinabove and as defined in the appended claims.

The embodiments of the invention in which an exclusive property or privilege is claimed are defined as follows:

1. A solution capable of being spun to form elastomeric fibers of segmented polyurethane copolymers, said segmented copolymers having polymer melt temperatures above 150° C. and an inherent viscosity of at least 2.0 when dissolved in a mixture consisting of 60% phenol and 40% tetrachloroethane, said copolymers containing from about 2% to about 40%, by weight of said segmented copolymers, of urea segments, essentially all of which are connected to polymeric glycol residues through urethane linkages, said urea segments containing at least one repeating unit of a polyurea having a melting point of at least 200° C. in the fiber forming molecular weight range of above about 10,000, said repeating unit being selected from the group consisting of:
 (a) —A—NH—CO—NH—D—NH—CO—NH—, and
 (b) mixtures of (a) and —A—NH—CO—NH—,
  with the proviso that at least 50% of the mixture comprises said (a), wherein —A— is the bivalent organic radical of an organic diisocyanate having the formula: OCN—A—NCO, and wherein —D— is (i) a nitrogen to nitrogen bond or (ii) the bivalent hydrocarbon radical of a hydrocarbon diamine having the formula: H₂N—D—NH₂, essentially all of said urea segments being connected to said polymeric glycol residues by urethane linkages of the formula:

—NH—CO—O— wherein the

—NH— of said urethane linkage is attached to the terminal radical —A— of said urea segment and the

—CO—O— of said urethane linkage is attached to residues remaining after the removal of the terminal hydroxyl groups of a linear polymeric glycol (I) having a melting point below about 60° C., (II) having a molecular weight in the range of from about 600 to about 12,000, and (III) consisting essentially of at least one member selected from the group consisting of:
(A) polyethers,
(B) polyesters,
(C) poly(ester-ethers), and
(D) oligomers of said (A), (B), or (C)

connected by from 1 to 10 intralinear linkages having the formula: —O—CO—NH—A—NH—CO—O—. wherein —A— is defined above, said solution being that which is formed by a process comprising the following steps:

(1) forming a macrodiisocyanate by reacting at least 1.3 moles of a diisocyanate, as defined above, with 1.0 mole of a linear polymeric glycol, as defined above, (2) treating said macrodiisocyanate by subjecting same to solvent extraction or distillation to remove at least 40% by weight of the unreacted diisocyanate present in step (1), and (3) reacting, in the presence of a solvent for said copolymer about to be formed, the product of step (2) with a member selected from the group consisting of (a) a diamine, as defined above, (b) water, and (c) mixtures of said diamines and water, in such proportions that the ratio of active hydrogen atoms in said diamine, water, or mixtures thereof which react with free isocyanate groups in the product of step (2) is between about 0.7:1.0 to about 1.0:1.0 reacted active hydrogen to reacted free isocyanate.

2. The solution of claim 1, wherein at least 1.8 moles of diisocyanate are reacted with 1.0 mole of polymeric glycol in step (1).

3. Elastomeric fibers spun from the solution of claim 1.

4. The solution of claim 1, wherein said treating step (2) is performed by means of distillation.

5. The solution of claim 1 wherein said hydroxyl-terminated polymer comprises a polymer of tetramethylene glycol.

6. The solution of claim 5 wherein said hydroxyl-terminated polymer is a copolymer of tetrahydrofuran and 8-oxabicyclo[4.3.0]nonane.

7. The solution of claim 1, wherein essentially 100% of the unreacted diisocyanate is removed in step (2).

8. Elastomeric fibers spun from the solution of claim 7.

9. The fibers of claim 8 wherein said diisocyanate is selected from the group consisting of m-xylylene diisocyanate and p-xylylene diisocyanate, said diamine is selected from the group consisting of m-xylylenediamine, p-xylylenediamine and alkanediamines having from 2 to 17 carbon atoms, and said low-melting hydroxyl-terminated polymer comprises a polymer of tetramethylene glycol.

10. The solution of claim 1, wherein at least 80% of the unreacted diisocyanate is removed in step (2).

11. Elastomeric fibers spun from the solution of claim 10.

12. The solution of claim 1, wherein said treating step (2) is performed by means of solvent extraction with an extractive chemical.

13. The solution of claim 12 wherein said extractive chemical is propylene carbonate.

14. The solution of claim 12 wherein said extractive chemical is acetonitrile.

15. The solution of claim 12 wherein said extractive chemical is cyclohexane.

16. The solution of claim 12 wherein said extractive chemical has 2 to 12 carbon atoms and is selected from the group consisting of hydrocarbons, acyl nitriles, and acyl esters, said extractive chemical being a nonsolvent for said segmented polyurethane copolymer.

References Cited

UNITED STATES PATENTS

| | | | |
|---|---|---|---|
| 2,929,804 | 3/1960 | Steuber | 260—77.5 |
| 3,009,764 | 11/1961 | Urs | 18—54 |
| 3,097,192 | 7/1963 | Schilit | 260—75 |
| 3,105,062 | 9/1963 | Graham et al. | 260—75 |
| 3,133,897 | 5/1964 | Inaba et al. | 260—45.85 |
| 3,180,853 | 4/1965 | Peters | 260—77.5 |
| 3,180,854 | 4/1965 | Schneider et al. | 260—77.5 |
| 3,238,178 | 3/1966 | Kibler et al. | 260—45.85 |
| 3,243,413 | 3/1966 | Bell et al. | 260—75 |
| 3,267,192 | 8/1966 | Peters et al. | 264—203 |

FOREIGN PATENTS

| | | |
|---|---|---|
| 808,574 | 2/1959 | Great Britain. |
| 930,458 | 7/1963 | Great Britain. |
| 947,840 | 1/1964 | Great Britain. |
| 1,149,523 | 5/1963 | Germany. |
| 1,105,155 | 12/1961 | Germany. |
| 265,265 | 2/1966 | Australia. |

OTHER REFERENCES

Weiner: "Reaction of Phenyl Isocyanate With N,N-dimethylformamide," Journal of Organic Chemistry, volume 25, December 1960, pages 2245–2246 cited.

DONALD E. CZAJA, *Primary Examiner.*

F. McKELVEY, *Assistant Examiner.*

U.S. Cl. X.R.

260—30.4, 30.8, 32.6, 33.6, 33.8, 75, 453, 583, 615; 264—184

UNITED STATES PATENT OFFICE
CERTIFICATE OF CORRECTION

Patent No. 3,415,790                                                          December 10, 1968

Burns Davis et al.

It is certified that error appears in the above identified patent and that said Letters Patent are hereby corrected as shown below:

Column 2, line 1, "8B" should read -- 8(B) --. Column 4, line 43, "anhydries" should read -- anhydrides --. Column 7, line 24, "urethane-lniked" should read -- urethane-linked --. Column 8, line 2, "isocynate" should read -- isocyanate --. Column 13, line 33, "cyclobutene" should read -- cyclobutane --; line 38, "cis- and trans-isomers" should read -- cos and trans isomers --. Column 14, line 29, "en" should read -- an --; line 59, "chomatography" should read -- chromatography --; line 65, "puresented" should read -- presented --. Column 18, line 27, "320° C." should read -- 32° C. --. Column 20, line 73, "(2 or 3 months longer)" should read -- (2 to 3 months or longer) --. Column 21, line 1, "99-12" should read -- 9-12 --; line 22, after "9-12" insert -- is --.

Signed and sealed this 10th day of March 1970.

(SEAL)
Attest:

EDWARD M. FLETCHER, JR.                                     WILLIAM E. SCHUYLER, JR.
Attesting Officer                                                       Commissioner of Patents